Figure 1:
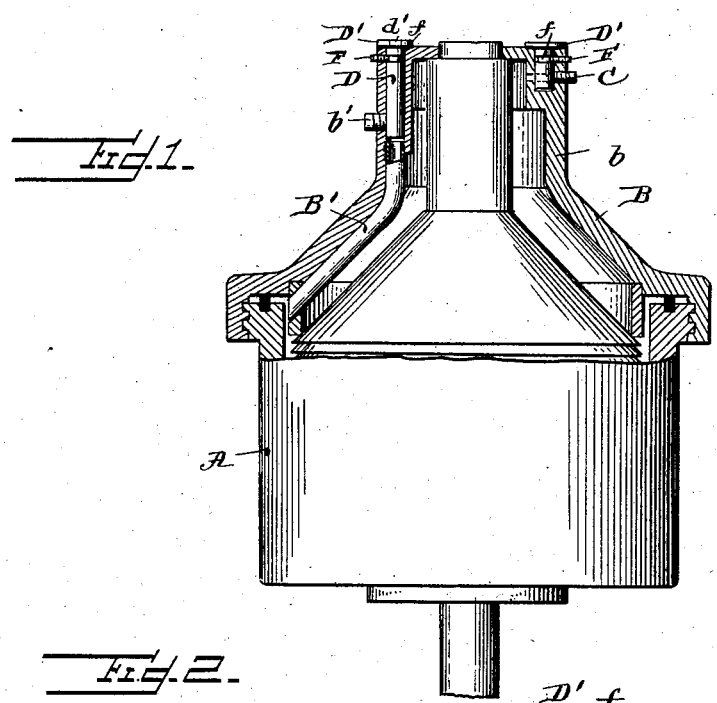

No. 729,532. PATENTED JUNE 2, 1903.
J. J. BERRIGAN.
CENTRIFUGAL CREAM SEPARATOR.
APPLICATION FILED JAN. 13, 1900.
NO MODEL.

WITNESSES:
Jesse B. Heller.
J. M. Shindler Jr.

INVENTOR
John Joseph Berrigan
BY
ATTORNEYS

No. 729,532. Patented June 2, 1903.

UNITED STATES PATENT OFFICE.

JOHN JOSEPH BERRIGAN, OF AVON, NEW YORK, ASSIGNOR TO THE DE LAVAL SEPARATOR COMPANY, A CORPORATION OF NEW JERSEY.

CENTRIFUGAL CREAM-SEPARATOR.

SPECIFICATION forming part of Letters Patent No. 729,532, dated June 2, 1903.

Application filed January 13, 1900. Serial No. 1,276. (No model.)

*To all whom it may concern:*

Be it known that I, JOHN JOSEPH BERRIGAN, a citizen of the United States, residing at Avon, county of Livingston, and State of New York, have invented a new and useful Improvement in Centrifugal Cream-Separators, of which the following is a full, clear, and exact description, reference being had to the accompanying drawings, which form a part of this specification.

My invention is particularly adapted for use with that class of liquid-separators in which the liquid acted upon is milk and which is separated into its constituent elements—skim-milk and cream. In this class of machines the adjustment for the desired constituency of the skim-milk and cream is made preliminarily to starting the machine. This adjustment is obtained either by the relative distances from the center of the bowl of the skim-milk and cream outlets or by regulating the size of the discharge-orifices for the cream and skim-milk. After the machine has been started and while in operation it is impossible under present constructions to vary the size of the discharge-orifices and cream of a given specific gravity or thickness being delivered continuously. In order to make any change in the discharge-orifices, it is necessary to stop the machine, and when stopped to readjust the size of either or both discharge-orifices.

The object of my invention is to provide a construction which will enable the operator without stopping the machine to vary the size of the discharge-outlet for the skim-milk or cream, or both, so as to deliver cream from the machine in different volumes or at different specific gravities, dependent upon different adjustments of the size of these discharge-orifices.

I have in the drawings set out an embodiment of my invention, although I do not intend to limit myself, except wherein the same is claimed, to the specific embodiment here shown.

Figures 2, 3:
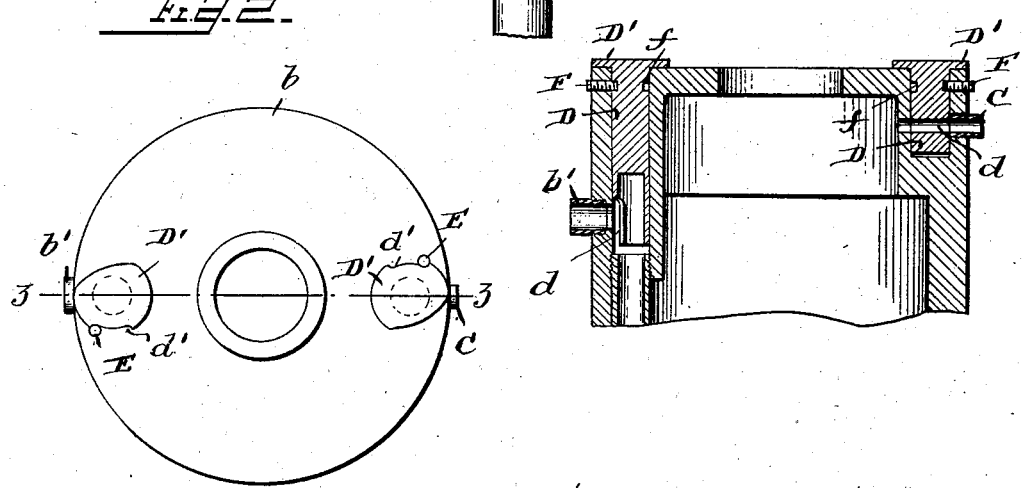
Figure 4:
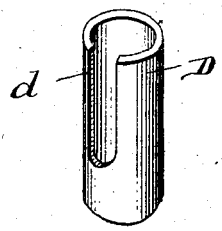

In the drawings, Figure 1 is a side elevation of the bowl, partially in section. Fig. 2 is a plan view of part of the bowl. Fig. 3 is a section on line 3 3, Fig. 2. Fig. 4 is a perspective view of the valve.

A is the bowl of a centrifugal cream-separator; B, the cover, having the neck $b$.

B' is the skim-milk tube connected with the skim-milk outlet $b'$.

C is the cream-discharge outlet.

In the neck of the bowl vertical orifices or channels are made, in the one case extending through the cream-discharge outlet C and in the other case extending to and beyond the skim-milk orifice $b'$ and into connection with the skim-milk-discharge tube B'. In these channels are placed the valves D. In Fig. 4 is shown in detail the lower portion of the valve. Referring to the valve in the skim-milk side of the bowl, as may be seen referring to Fig. 4, the valve is tubular and has a portion $d$ cut away, which cut-away portion registers with the skim-milk-discharge orifice $b'$, so that at the skim-milk-discharge orifice there is an opening from the inner to the outer surface of this tubular valve. The lower portion of this valve registers with the skim-milk tube B'.

Beyond the top of the bowl, projecting from the top of the valve D, is the flange D', provided with the cut-away portion $d'$. (See Fig. 2.)

E is a pin on the top of the bowl, resting in this cut-away portion. The interlocking of the pin with the walls of the cut-away portion determines the amount of rotation the valve D can have in the vertical orifice in the back of the bowl. During the rotation of the bowl by holding a rod in line of movement on one side or the other of the flange D' the valve D will be rotated more or less and the orifice $d$ will be presented to the discharge-orifice $b'$, and thus during the rotation of the bowl the inner mouth of the discharge-orifice $b'$ may be varied in size.

F is a pin projecting through the neck of the bowl and resting in a groove $f$ in the valve to prevent the valve from rising vertically. The valve in the orifice on the cream-discharge-outlet side of the bowl differs from the valve in the skim-milk-discharge orifice only in that the orifice $d$ is directly through both walls of the valve in line with the cream-discharge outlet. By the rotation of this valve more or less of this orifice is presented to the cream-discharge outlet C, and thus the size of the cream-discharge outlet may be varied during the rotation of the bowl. As I have previously stated in this specification, a regulator of this kind may be used to coact with the skim-milk-discharge orifice alone or may be used to coact with the cream-discharge orifice alone, or with both. The effect of the variation of the size of the discharge-orifices, either or both, is to vary the specific gravity passing through the respective discharge-orifices, as is well known.

I do not intend to limit myself to the specific construction shown and described for varying the size of the orifice with the cream and skim-milk. I believe myself to be the first who has provided a construction and mechanism whereby during the rotation of the bowl the discharge-orifices for the milk or cream, or both, may be varied in size, and speaking generally in reference to my invention this is accomplished by providing a valve which is movable to vary the size of either or both of these orifices, and, further, providing a device or devices connected therewith and rotating with the bowl, which when struck by the operator will move the valve to vary the size of the discharge-outlet.

Having now fully described my invention, what I claim, and desire to protect by Letters Patent, is—

1. In a centrifugal cream-separator, the combination with a rotatable bowl, provided with a liquid-discharge-regulating device to vary the size of the discharge, of a movable operating device connected therewith and rotating with the bowl for controlling in its movement the regulating device, said operating device extending exterior of the bowl and adapted to move when, in the rotation of the bowl, it meets an obstruction.

2. In a centrifugal cream-separator, the combination with a rotatable bowl, provided with a liquid-discharge tube, of a movable operating device to vary the size of the discharge-orifice for said tube, rotating with the bowl, said operating device extending exterior of the bowl and adapted to move when in the rotation of the bowl it meets an obstruction.

3. In a centrifugal cream-separator, the combination with a rotatable bowl, provided with a liquid-discharge tube, of a movable operating device rotating with the bowl to vary the size of the discharge-orifice for said tube and adapted to maintain itself in the position to which it is moved, said operating device extending exterior of the bowl and adapted to move when in the rotation of the bowl it meets an obstruction.

4. In a centrifugal cream-separator, in combination with a rotatable bowl provided with a liquid-discharge tube rotating with the bowl, of a movable operating device rotating with the bowl and freely movable in two directions to vary the size of the discharge-orifice for said tube, and adapted to maintain itself in the position to which it is moved, said operating device extending exterior of the bowl and having surfaces revolving with the bowl in substantially different circumferences and adapted to move when in the rotation of the bowl an obstruction is met.

5. In a centrifugal cream-separator, in combination with a rotatable bowl, of a liquid-discharge tube rotating with the bowl, a device rotating with the bowl and freely movable in two directions to vary the size of the discharge-orifice for said tube, and adapted to maintain itself in the position to which it is moved, said device having surfaces revolving with the bowl in substantially different circumferences, said devices being adapted to be moved in either direction by contact of one or the other of said surfaces with an extraneous object.

6. In a centrifugal cream-separator, in combination with the revolving bowl provided with a liquid-discharge orifice, of a valve mounted in the neck of the bowl, said valve controlling the size of said orifice and movable freely in two directions and adapted to maintain itself in the position to which it is moved, a portion of said valve extending exterior of the bowl and adapted to move when, in the rotation of the bowl, it meets an obstruction.

7. In a centrifugal cream-separator, in combination with the revolving bowl provided with a liquid-discharge orifice, of a valve mounted in the neck of the bowl, said valve controlling the size of said orifice, and movable freely in two directions and adapted to maintain itself in the position to which it is moved, a portion of said valve extending exterior of said bowl and adapted to move when, in the rotation of the bowl, it meets an obstruction.

8. In a centrifugal cream-separator, in combination with the revolving bowl provided with a liquid-discharge orifice revolving with the bowl, of a valve rotatably mounted in the neck of the bowl and having a flanged projection overlying the upper surface of the neck of the bowl, said valve controlling the size of said orifice.

9. In a centrifugal cream-separator, in combination with the revolving bowl provided with a liquid-discharge orifice, of a valve mounted in the neck of the bowl and having a flanged projection, provided with a cut-away portion, overlying the upper surface of the neck of the bowl, said valve controlling the size of said orifice.

10. In a centrifugal cream-separator, in combination with the revolving bowl provided with a liquid-discharge orifice, of a valve mounted in the neck of the bowl and having a flanged projection, provided with a cut-away portion, overlying the upper surface of the neck of the bowl, said valve controlling the size of said orifice, a pin in the top of the bowl between the walls of said cut-away portion.

11. In a centrifugal cream-separator, in combination with the revolving bowl, provided with a liquid-discharge orifice, of a rotating valve movable to vary the size of said orifice, said valve having a projecting portion adapted when struck to move the valve to vary the size of said discharge-orifice.

In testimony of which invention I have hereunto set my hand at New York on this 11th day of January, 1900.

JOHN JOSEPH BERRIGAN.

Witnesses:
  JOHN S. PAUL,
  GEO. R. REMINGTON.